United States Patent
Fujiwara et al.

(10) Patent No.: US 9,982,751 B2
(45) Date of Patent: May 29, 2018

(54) SILENT CHAIN, BUSH CHAIN, AND ROLLER CHAIN

(71) Applicant: HONDA MOTOR CO., LTD., Tokyo (JP)

(72) Inventors: Akira Fujiwara, Wako (JP); Takeo Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 198 days.

(21) Appl. No.: 15/132,241

(22) Filed: Apr. 19, 2016

(65) Prior Publication Data

US 2016/0312855 A1  Oct. 27, 2016

(30) Foreign Application Priority Data

Apr. 22, 2015 (JP) .................................. 2015-087472

(51) Int. Cl.
| | |
|---|---|
| *F16G 13/04* | (2006.01) |
| *F16G 13/06* | (2006.01) |
| *F16G 13/08* | (2006.01) |

(52) U.S. Cl.
CPC ............. *F16G 13/04* (2013.01); *F16G 13/06* (2013.01); *F16G 13/08* (2013.01)

(58) Field of Classification Search
CPC ........... F16G 13/02; F16G 13/04; F16G 13/06
See application file for complete search history.

(56) References Cited

U.S. PATENT DOCUMENTS

| | | | | |
|---|---|---|---|---|
| 5,803,852 | A | * | 9/1998 | Agostinelli ............. F16G 13/06 474/161 |
| 5,823,686 | A | * | 10/1998 | Murano ................... F16C 33/34 384/463 |
| 2003/0087747 | A1 | * | 5/2003 | Nagai ................... C04B 35/495 501/87 |

(Continued)

FOREIGN PATENT DOCUMENTS

| | | |
|---|---|---|
| JP | 57-085967 | 5/1982 |
| JP | 2003-139199 | 5/2003 |

(Continued)

OTHER PUBLICATIONS

Japanese Office Action for corresponding JP Application No. 2015-087472, dated Sep. 28, 2016.

(Continued)

*Primary Examiner* — William E Dondero
*Assistant Examiner* — Robert T Reese
(74) *Attorney, Agent, or Firm* — Mori & Ward, LLP

(57) ABSTRACT

A silent chain includes a first link, a second link, and coupling pins. The first link is configured from one or more first link plates that include a pair of first pin holes. The second link is configured from one or more second link plates that include a pair of second pin holes. The coupling pins are inserted through the respective first pin holes of the first link plate and the respective second pin holes of the second link plate. The coupling pins alternately couple the first link and the second link together along a chain drive direction so as to enable the first link and the second link to flex. Abrasive particles are embedded in inner peripheral faces at the pin holes of the first link plate and the second link plate.

24 Claims, 5 Drawing Sheets

(56) References Cited

U.S. PATENT DOCUMENTS

| | | | | |
|---|---|---|---|---|
| 2004/0018905 A1* | 1/2004 | Okabe | ............... | F16G 13/06 474/231 |
| 2007/0032325 A1* | 2/2007 | Shimaya | ............... | B21L 9/02 474/213 |
| 2008/0015071 A1* | 1/2008 | Fujiwara | ............... | F16G 13/02 474/206 |
| 2008/0273827 A1* | 11/2008 | Fujiwara | ............... | C23C 8/22 384/625 |
| 2009/0062160 A1* | 3/2009 | Kondo | ............... | C10M 169/04 508/106 |
| 2015/0247553 A1* | 9/2015 | Asgarpour | ............... | F16G 13/02 428/457 |
| 2016/0153525 A1* | 6/2016 | Eda | ............... | C22C 38/12 474/228 |

FOREIGN PATENT DOCUMENTS

| | | |
|---|---|---|
| JP | 2011-185297 | 9/2011 |
| JP | 2014-224556 | 12/2014 |
| JP | 2015-014300 | 1/2015 |

OTHER PUBLICATIONS

Chinese Office Action for corresponding CN Application No. 201610116610.7, dated Sep. 4, 2017 (w/ English machine translation).

* cited by examiner

FIG. 8A
FIG. 8B
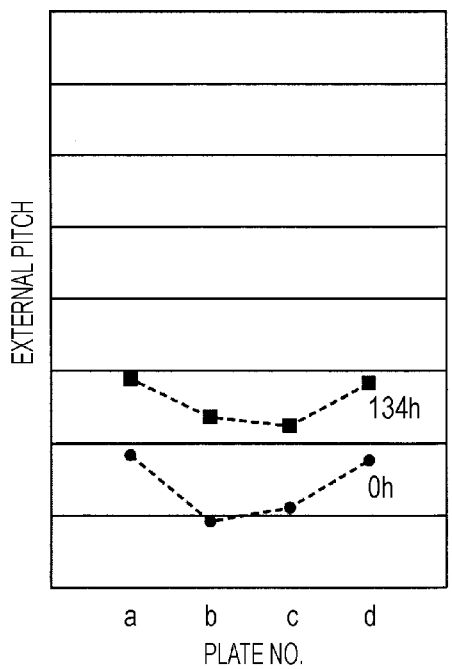
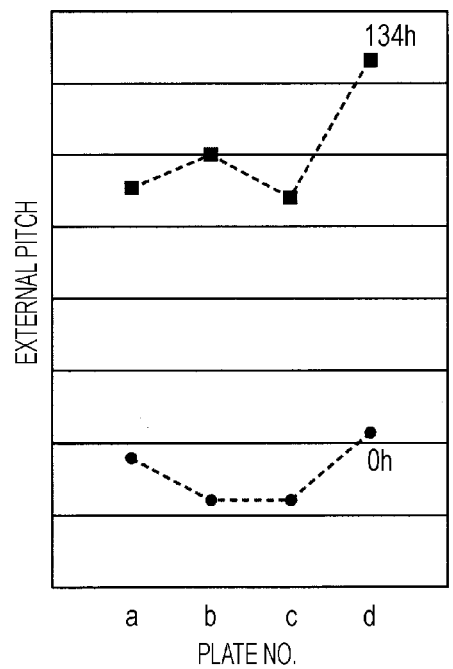
FIG. 9
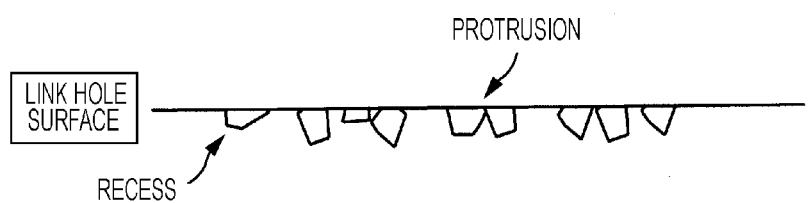

SILENT CHAIN, BUSH CHAIN, AND ROLLER CHAIN

CROSS-REFERENCE TO RELATED APPLICATIONS

The present application claims priority under 35 U.S.C. § 119 to Japanese Patent Application No. 2015-087472, filed Apr. 22, 2015, entitled "Silent Chain, Bush Chain, and Roller Chain." The contents of this application are incorporated herein by reference in their entirety.

BACKGROUND

1. Field

The present disclosure relates to a silent chain, a bush chain, and a roller chain.

2. Description of the Related Art

As described in Japanese Unexamined Patent Application Publication No. 2014-224556, for example, silent chains are configured by arranging link plates, each including a pair of teeth and pin holes, so as to be offset with respect to each other in a length direction, inserting coupling pins through the pin holes so as to be rotatable therein and to couple the link plates together, and also disposing guide plates, each including a pair of pin fixing holes, at the side of the outermost link plates, and press fitting the coupling pins into the pin fixing holes. As described in Japanese Unexamined Patent Application Publication No. 2011-185297, bush chains are configured including an inner link, provided with a pair of parallel inner plates and a tube shaped bush inserted through the inner plates, and an outer link, provided with a pair of outer plates disposed at the outside of the inner plates, and a pin inserted through the outer plates and also inserted through the inside of the bush. The inner links and the outer links are alternately coupled together in an endless shape.

SUMMARY

According to a first aspect of the present invention, a silent chain includes a first link, a second link, and coupling pins. The first link is configured from one or more first link plates that include a pair of first pin holes. The second link is configured from one or more second link plates that include a pair of second pin holes. The coupling pins are inserted through the respective first pin holes of the first link plate and the respective second pin holes of the second link plate. The coupling pins alternately couple the first link and the second link together along a chain drive direction so as to enable the first link and the second link to flex. Abrasive particles are embedded in inner peripheral faces at the pin holes of the first link plate and the second link plate.

According to a second aspect of the present invention, a bush chain includes a plurality of units. The plurality of units are coupled together in an endless shape and each include a pair of inner plates, a bush, a pair of outer plates, and a coupling pin. The pair of inner plates each include a pair of bush holes. The bush is fixed to the bush hole and includes a pin hole. The pair of outer plates are each disposed at the outside of the respective inner plate. The coupling pin is fixed to the outer plates, and is inserted through and rotatable in the pin hole of the bush. Abrasive particles are embedded in an inner peripheral face at the pin hole of the bush.

According to a third aspect of the present invention, a roller chain includes a plurality of units. The plurality of units are coupled together in an endless shape and each include a pair of inner plates, a bush, a roller, a pair of outer plates and a coupling pin. The pair of inner plates each include a pair of bush holes. The bush is fixed to the bush hole and includes a pin hole. The roller is rotatably supported at an outer periphery of the bush. The pair of outer plates are each disposed at the outside of the respective inner plate. The coupling pin is fixed to the outer plates, and is inserted through and rotatable in the pin hole of the bush. Abrasive particles are embedded in an inner peripheral face at the pin hole of the bush.

According to a fourth aspect of the present invention, a silent chain includes a first link, a second link, abrasive particles, and a coupling pin. The first link includes at least one first link plate that has a pair of first pin holes. The second link includes at least one second link plate that has a pair of second pin holes. The abrasive particles are embedded in inner peripheral faces of the first pin holes and the second pin holes. The coupling pin is inserted through one of the first pin holes and one of the second pin holes so that the first link and the second link are alternately coupled along a chain drive direction in which the silent chain is to move so that the first link and the second link are flexible along the chain drive direction.

According to a fifth aspect of the present invention, a bush chain includes bush chain units. The bush chain units are coupled together in an endless shape and each include a first inner plate, a second inner plate, a bush, abrasive particles, a first outer plate, a second outer plate, and a coupling pin. The first inner plate includes a pair of first bush holes. The second inner plate includes a pair of second bush holes. The bush has a first end and a second end opposite to the first end and is provided between the first inner plate and the second inner plate so that the first end and the second end are inserted through one of the first bush holes and one of the second bush holes, respectively. The bush includes a pin hole extending from the first end to the second end. The abrasive particles are embedded in an inner peripheral face of the pin hole. The first outer plate is disposed on an opposite side of the bush with respect to the first inner plate. The second outer plate is disposed on an opposite side of the bush with respect to the second inner plate. The coupling pin is connected to the first outer plate and the second outer plate and rotatably inserted through the pin hole of the bush.

According to a sixth aspect of the present invention, a roller chain includes roller chain units. The roller chain units are coupled together in an endless shape and each include a first inner plate, a second inner plate, a bush, abrasive particles, a first outer plate, a second outer plate, and a coupling pin. The first inner plate includes a pair of first bush holes. The second inner plate includes a pair of second bush holes. The bush has a first end and a second end opposite to the first end and is provided between the first inner plate and the second inner plate so that the first end and the second end are inserted through one of the first bush holes and one of the second bush holes, respectively. The bush includes a pin hole extending from the first end to the second end. A roller is rotatably supported at an outer periphery of the bush. The abrasive particles are embedded in an inner peripheral face of the pin hole. The first outer plate is disposed on an opposite side of the bush with respective to the first inner plate. The second outer plate is disposed on an opposite side of the bush with respective to the second inner plate. The coupling pin is connected to the first outer plate and the second outer plate and rotatably inserted through the pin hole of the bush.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 8A is a graph illustrating a relationship between operating time and external pitch of link plates in an embodiment of the present application in which alumina is embedded, and FIG. 8B is a graph illustrating a relationship between operating time and external pitch of link plates in a comparative example in which alumina is not embedded.

FIG. 9 is a cross-section illustrating a state in which abrasive particles have fallen off an inner peripheral face at a pin hole to form recesses and protrusions.

DESCRIPTION OF THE EMBODIMENTS

Figure 1:
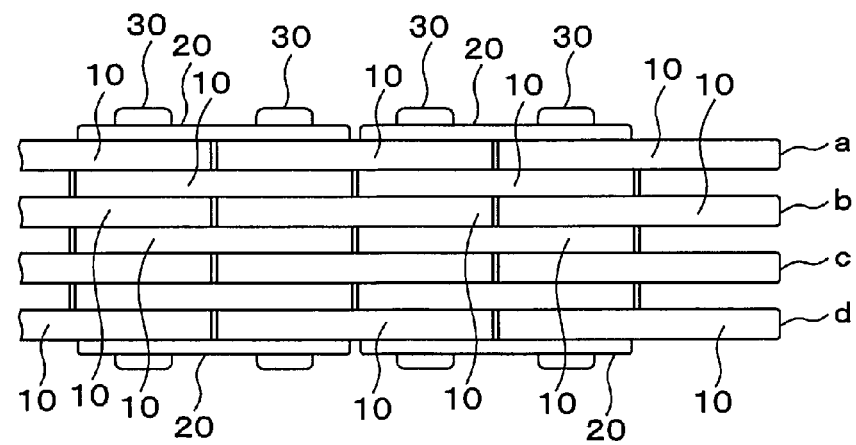
FIG. 1 is a partial plan view illustrating part of a silent chain of a first embodiment of the present application.

The embodiments will now be described with reference to the accompanying drawings, wherein like reference numerals designate corresponding or identical elements throughout the various drawings.

1. First Embodiment

Figure 2:
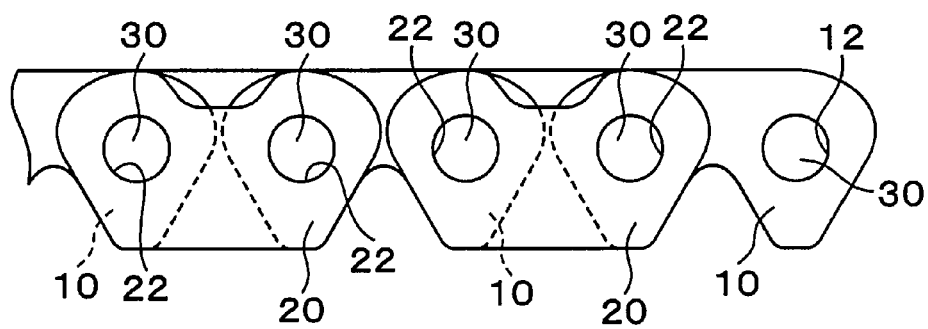
FIG. 2 is a side view illustrating part of a silent chain according to the first embodiment of the present application.
Figure 3A:
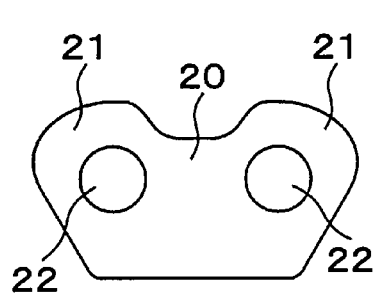
FIG. 3A, FIG. 3B, and FIG. 3C are side views illustrating a guide plate, a link plate, and a pin.
Figure 3B:
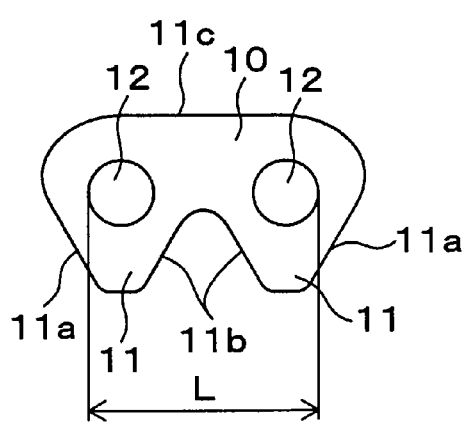
Figure 3C:
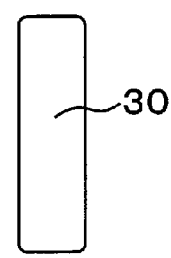
Figure 4A:
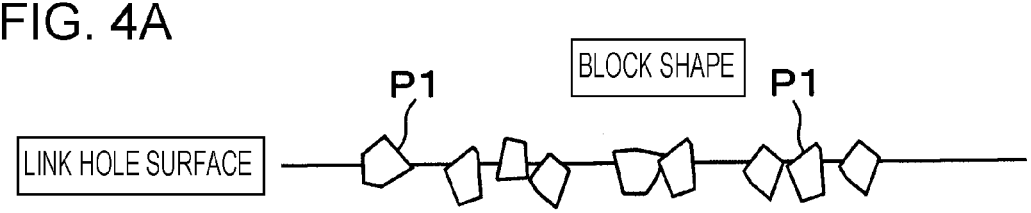
FIG. 4A to FIG. 4C are cross-sections illustrating the inside of a pin hole of a link plate.
Figure 4B:
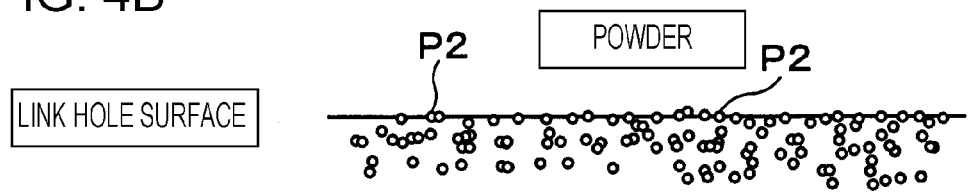
Figure 4C:
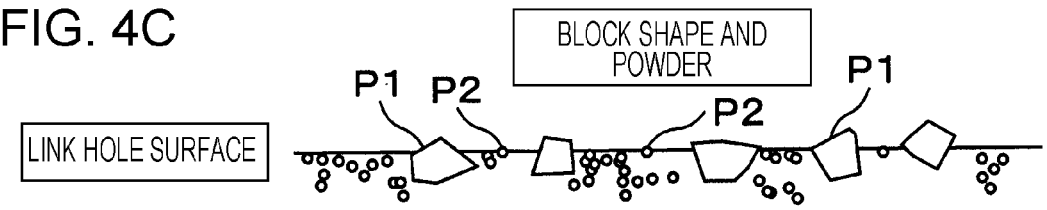

Explanation follows regarding an embodiment of the present application, with reference to FIG. 1 to FIGS. 4A to 4C. FIG. 1 is a partial plan view illustrating part of a silent chain of the embodiment. FIG. 2 is a side view thereof. The reference numerals 10 in the drawings indicate link plates (in sets of four first link plates and three second link plates). Each link plate 10 has a plate shape, and is formed with two teeth 11 in a row along one side of the link plate 10 so as to project out in substantially triangular shapes toward the side. Outside flanks 11a and inside flanks 11b of the teeth 11 mesh with a sprocket (not illustrated in the drawings), and back faces 11c of the teeth 11 slide against a chain guide (not illustrated in the drawings). A pair of circular pin holes 12 are respectively formed on center lines of the respective teeth 11. Abrasive particles of alumina ($Al_2O_3$), for example, are embedded in the inner peripheral face at each pin hole 12. Namely, as illustrated in FIG. 4A, lump shaped abrasive particles P1 are embedded in the inner peripheral face at the pin holes 12, in an at least partially exposed state at the inner peripheral face. FIG. 4B illustrates a state in which powdered abrasive particles P2 are embedded in an at least partially exposed state at the inner peripheral face, and FIG. 4C illustrates a state in which lump shaped abrasive particles P1 and powdered abrasive particles P2 are embedded in an at least partially exposed state at the inner peripheral face. The particle size of the lump shaped abrasive particles P1 is 3 μm or smaller.

The reference numerals 20 in the drawings indicate guide plates. The guide plates 20 are disposed on either side of the sprocket in the sprocket plate thickness direction, so as to prevent the silent chain from coming off the sprocket. Each guide plate 20 has a plate shape, and two protrusions 21 are formed in a row along one side of each guide plate 20 so as to project out toward the opposite side to the projection direction of the teeth 11. A pin hole 22 is formed inside each protrusion 21. The pitch of the pin holes 22 is the same as the pitch of the pin holes 12 of the link plates 10.

As illustrated in FIG. 1, plural of the link plates 10 are arranged such that their respective pin holes 12 are at different positions to each other along the plate thickness direction, and coupling pins 30 are inserted through and rotatable in the respective pin holes 12. End portions of the coupling pins 30 are fixed to the pin holes 22 of the guide plates 20 by press fitting, riveting, or the like. The coupling pins 30 are configured by circular steel rods with surface covering of a hard layer such as of VC or the like.

There is a manufacturing tolerance in an external pitch L of the link plates 10, illustrated in FIG. 3B. The difference between the maximum value and the minimum value of the external pitch L of the link plates 10, labeled a to d in FIG. 1, gives rise to a pitch step. During driving of the silent chain configured as described above, when adjacent link plates 10 flex with respect to each other, the abrasive particles embedded in the inner peripheral faces at the pin holes 12 of the link plates 10 are rubbed by the coupling pins 30 and fall out, so as to function as abrasive particles between the pin holes 12 and the coupling pins 30.

Link plates 10 having a short external pitch L are pulled with a large force along their length direction by the coupling pins 30, such that the pin holes 12 are scraped hard by the coupling pins 30. When this occurs, the inner peripheral faces at the pin holes 12 are ground by the abrasive particles, such that the external pitch L of the link plate 10 is adjusted until it is similar to the external pitch of the other link plates. Since the pitch step between the link plates with respect to the coupling pins becomes smaller, load distribution across the link plates 10 becomes more uniform, thereby enabling stretching of the silent chain to be suppressed as a result. Moreover, the grinding effect of employing abrasive particles of a specific particle size enables generation of coarse abraded grit to be suppressed from occurring during external pitch adjustment. This thereby enables abraded grit to be reliably prevented from causing adhesive wear between the coupling pins and the inner peripheral faces at the holes during chain driving, thus improving the wear characteristics of the chain itself.

2. Second Embodiment

Figure 5A:
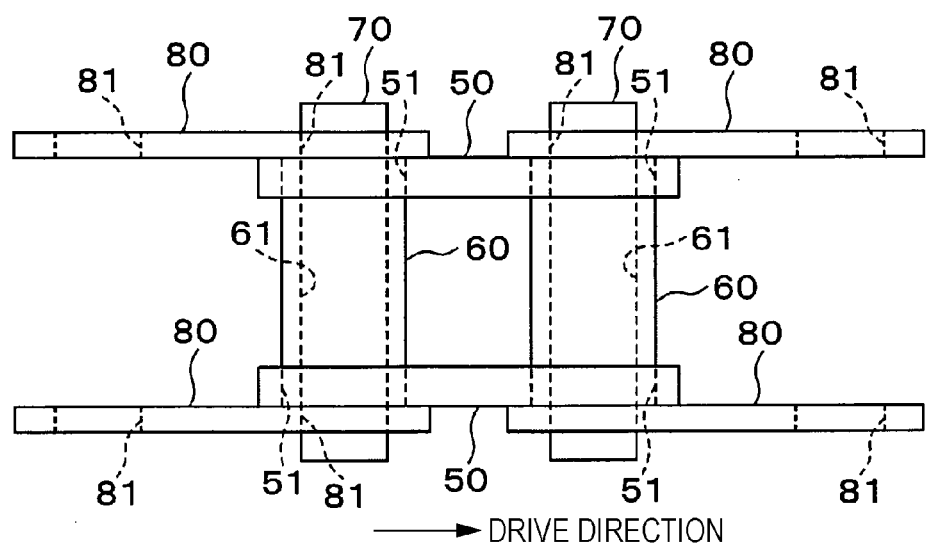
FIG. 5A and FIG. 5B are plan views illustrating part of a bush chain of a second embodiment of the present application.
Figure 5B:
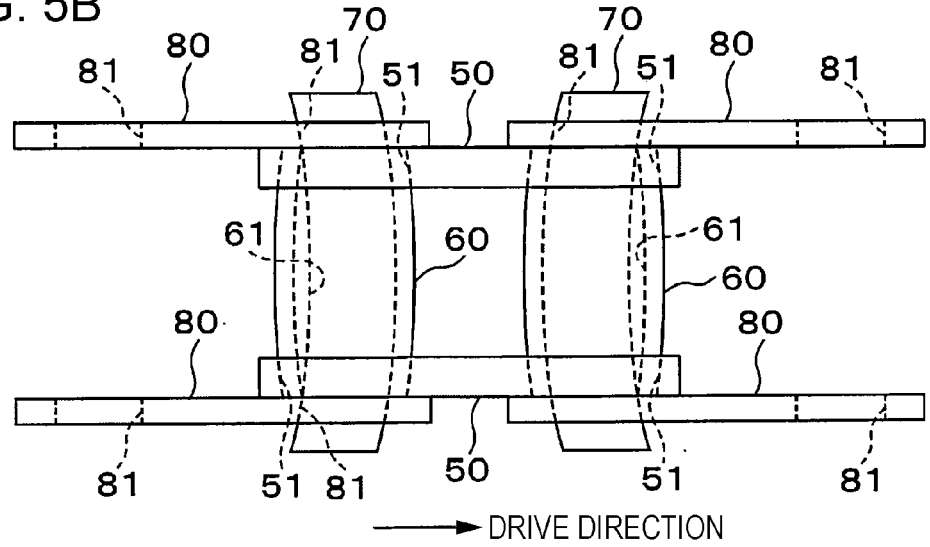
Figure 6:
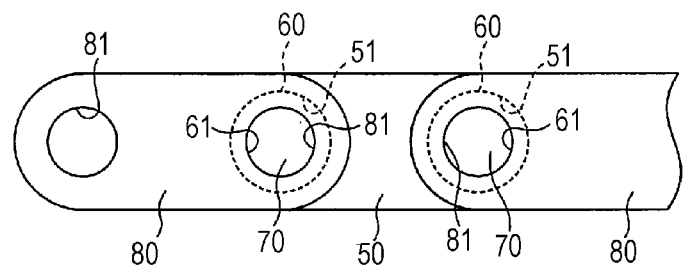
FIG. 6 is a side view illustrating part of a bush chain of the second embodiment of the present application.

FIG. 5A, FIG. 5B, and FIG. 6 illustrate a second embodiment of the present application, and illustrate an example in which the present application is applied to a bush chain. The reference numerals 50 in the drawings indicate inner plates. Each inner plate 50 has a flat plate shape formed with a semicircular shape at both ends, and bush holes 51 are respectively formed on both sides of each inner plate 50. An end portion of a bush 60 is press-fitted into and fixed to each bush hole 51.

Each bush 60 has a circular cylinder shape, with a hollow portion of the bush 60 configuring a pin hole 61. Abrasive particles of alumina ($Al_2O_3$), for example, are embedded in an inner peripheral face at each pin hole 61. Coupling pins 70 are inserted through and rotatable in the respective pin holes 61.

Outer plates 80 are disposed at the two outside faces of the inner plates 50. Each outer plate 80 has a flat plate shape formed with a semicircular shape at each end, and pin fixing holes 81 are respectively formed at both ends of each outer plate 80. The pitch of the pin fixing holes 81 is the same as the pitch of the bush holes 51 of the inner plates 50. End portions of the coupling pins 70 are fixed to the pin fixing holes 81 by press fitting, crimping, or the like.

In the bush chain configured as described above, when adjacent inner plates 50 and outer plates 80 flex with respect to each other, the abrasive particles embedded in the inner peripheral faces at the pin holes 61 of the bushes 60 are rubbed by the coupling pins 70 and fall out, so as to function as abrasive particles between the pin holes 61 and the coupling pins 70. When the inner plates 50 and the outer plates 80 are pulled with a large force along their length direction by the coupling pins 70, as illustrated in FIG. 5B, since each of the bushes 60 is press-fitted into the respective bush holes 51, the two end portions of the pin holes 61 are decreased in diameter, and central portions of the pin hole 61 bulge out in a barrel shape. There is accordingly no contact with the coupling pins 70 at the central portions of the pin holes 61, and there is stronger contact at the two end portions of the pin holes 61. When the coupling pins 70 slide hard against these portions of the pin holes 61, these portions are ground down by the abrasive particles embedded in the inner peripheral faces at the pin holes, thereby improving contact between the pin holes 61 and the coupling pins 70. This thereby enables stretching of the bush chain to be suppressed as a result. Moreover, the grinding effect of the abrasive particles enables the generation of coarse abraded grit to be suppressed from occurring, thereby enabling abraded grit to be prevented from causing adhesive wear during chain driving. This accordingly improves the wear characteristics of the chain itself.

In the embodiment described above is one in which the present application is applied to a bush chain. However, application may also be made to a roller chain in which rollers are rotatably supported by outer peripheral faces of the bushes 60.

Figure 7:
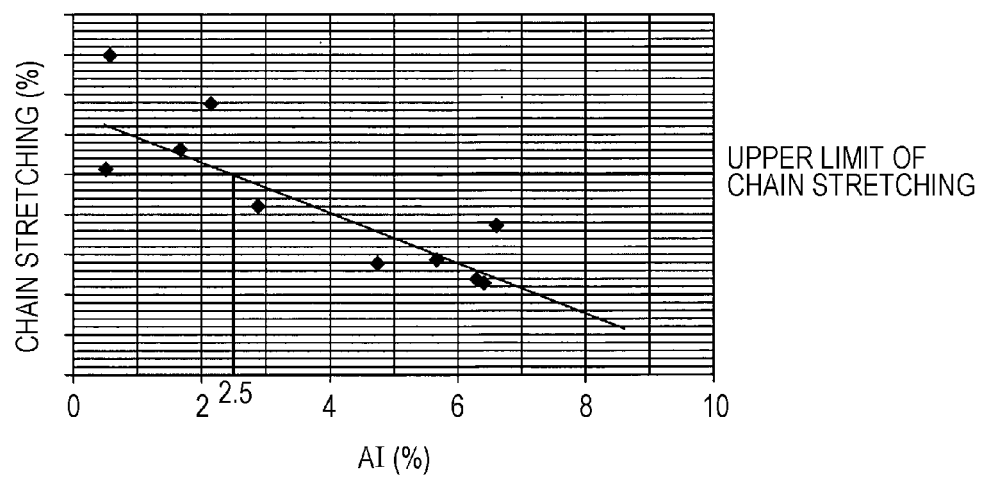
FIG. 7 is a graph illustrating a relationship of proportional chain stretch against the amount of Al of embedded alumina in an embodiment of the present application.

In silent chains such as that illustrated in FIG. 1, alumina ($Al_2O_3$) with an average particle size of 3 µm was embedded in the inner peripheral faces at the pin holes 12 of the link plates 10 in varying proportions, and each silent chain was entrained around a pair of sprockets. Stretching of the silent chains was measured after operating the silent chains for a specific length of time. Moreover, the inner peripheral faces at the pin holes 12 were analyzed using an Energy Dispersive X-ray (EDX) analysis device, and the proportion of Al by mass was measured in a region from the outermost surface to the deepest point at which Al was present (an abrasive particle layer). FIG. 7 illustrates the obtained proportions of Al by mass together with the obtained stretching of the silent chain.

As is apparent from FIG. 7, stretching of the silent chain decreased when the proportion by mass of Al as $Al_2O_3$ was 2.5% or greater. These results also confirmed that the proportion of abrasive particles in the abrasive particle layer of the link pin holes is preferably 5.0% by mass or greater, and further reduces stretching.

Changes in the external pitch of the link plates 10 after operation were then investigated. FIG. 8A illustrates the external pitches of the link plates 10 of the silent chain of the present application, labeled a to d in FIG. 1, prior to operation (0 h), and after being operated for 134 hours (134 h). Prior to operation, the external pitches of link plates 10 b and c were shorter than the external pitches of link plates a and d. After the inner peripheral faces at the pin holes 12 of the link plates 10 were ground by the abrasive particles during operation, the external pitches of the link plates 10 b and c had widened to approach the external pitches of the link plates 10 a and d. Accordingly, in the present application, the chain itself adjusted the pitch step so as to become substantially uniform when initially driven, without the performance of any particular post-processing to correct variation in the pitch. Stretching of the silent chain was accordingly suppressed.

FIG. 8B illustrates external pitch in a comparative example in which alumina was not embedded in the inner peripheral faces at the pin holes 12 of the link plates 10. As illustrated in FIG. 8B, there was a large overall widening of the external pitch between prior to operation (0 h) and after being operated for 134 hours (134 h), and there was also an increase in the pitch step between the link plates. Namely, this confirms that more severe chain stretching occurs as a result of variation in the external pitch in ordinary silent chains that do not include abrasive particles.

The present application may be applied to silent chains, bush chains, and roller chains employed as drive transmission devices in all fields of transportation machinery, industrial machinery, and the like.

A silent chain of the present application includes a first link configured from one or more first link plates that include a pair of first pin holes, a second link configured from one or more second link plates that include a pair of second pin holes, and coupling pins that are inserted through the respective first pin holes of the first link plate and the respective second pin holes of the second link plate. The coupling pins alternately couple the first link and the second link together along a chain drive direction so as to enable the first link and the second link to flex. Abrasive particles are embedded in inner peripheral faces at the pin holes of the first link plate and the second link plate. Note that in the present application, "embed" refers to a state in which the abrasive particles are distributed on a substrate in a state in which the abrasive particles are at least partially, or completely, buried in the surface, and are embedded such that the abrasive particles fall out from the inner peripheral face at the pin hole due to contact with the coupling pin during chain driving.

When the silent chain of the present application is driven, the first and second link plates mesh together with sprocket teeth, such that a flexing action takes place between the first and second link plates and the coupling pin. Accompanying a pulling force acting on the chain due to driving the sprocket, the inner peripheral faces at the pin holes and the surface of the coupling pin slide against each other in a contact state, pressed together in the drive direction, or the opposite direction thereto. When this occurs, the abrasive particles embedded in the inner peripheral faces at the pin holes of the link plates fall out due to friction with the coupling pin, and fall into clearance between the pin holes and the coupling pin surface. Lubricating oil is present in the clearance, and the lubricating oil mixes with fine powder of the fallen abrasive particles to attain a state suitable for grinding. Note that along the length direction of the respective coupling pins, load is applied to link plates that have a short external pitch before load is applied to other link plates, and for this reason, a larger load is applied to link plates along the length direction of the coupling pin that have a short external pitch than to the other link plates along the length direction of the coupling pin. When the chain is flexed in this state, the pin holes of link plates with a short external pitch are heavily ground by the abrasive particles, while the pin holes of link plates with a long external pitch are lightly ground, due to being applied with a smaller load than link plates with a short external pitch. Due to the flexing action during chain driving, the pin holes of the respective link plates that are arranged along the length direction of the coupling pin are ground such that the pin holes attain uniform external pitch dimensions. Further grinding does not occur after the external pitch dimensions have been adjusted so as to be substantially uniform, since the load applied to the respective link plates has become substantially uniform. The load acting on the link plates accordingly becomes uniform at an early stage, thereby suppressing initial stretching of the silent chain. The grinding agent configured by the lubricating oil and the abrasive particles finely polishes the coupling pin, and smooths recesses and protrusions on cut surfaces of the pin holes formed by press punching, thereby enabling a marked improvement in subsequent chain stretching, and an increase in durability.

Note that the hardness of the abrasive particles is preferably the same as or lower than the hardness of an outer peripheral face of the coupling pin, and higher than the hardness of the inner peripheral faces at the pin holes of the link plates. Namely, the hardness of each member is in the relationship coupling pin outer peripheral face>abrasive particles>pin hole inner peripheral faces. The inner peripheral faces at the pin holes can accordingly be ground without causing wear of the coupling pin, thereby enabling variation in pitch to be corrected without performing special processing.

Generally, an oxide grinding agent of alumina ($Al_2O_3$) is employed as the abrasive particles. These abrasive particles are embedded in the inner peripheral faces at the pin holes. The alumina is embedded in the pin holes of the link plates by barrel polishing. Alumina balls that are slightly smaller than the pin holes of the link plates, powdered alumina ($Al_2O_3$), and the link plates are placed in a barrel machine, and barrel polishing is performed by finishing barrel polishing. Powdered alumina in slurry form and the alumina balls enter the pin holes and contact the pin hole due to rotation and rocking of the barrel polishing machine. When this occurs, the alumina balls drive the powdered alumina into the surface of the pin holes. This thereby enables the powdered alumina to be embedded in the inner peripheral faces at the pin holes. Carbide abrasive particles such as silicon carbide (SiC), or abrasive particles such as diamonds, may be employed instead of oxide abrasive particles such as alumina.

Embedding the abrasive particles in the pin holes forms an abrasive particle layer in which the particles of the abrasive particles are distributed across the substrate in a surface layer region of the inner peripheral face at the pin holes. Investigation by the present applicants found that, for $Al_2O_3$ abrasive particles, the proportion of abrasive particles in the abrasive particle layer is preferably 2.5% Al by mass or greater (Al was analyzed using Energy Dispersive X-ray (EDX) analysis, and this was employed as a proxy value for $Al_2O_3$). This enables stretching of the silent chain to be effectively suppressed. 2.5% by mass of Al converts to about 5.0% by mass of $Al_2O_3$. Moreover, the average particle size of the alumina abrasive particles is preferably 3 μm or smaller. Abrasive particles of this size give a fine polish to the sliding faces, and maintain an appropriate sliding environment between the pin and the inner faces at the pin holes, thereby enabling chain stretching to be suppressed. If, on the other hand, the particle size of the abrasive particles is too large, chain stretching cannot be appropriately suppressed. This is due to the following reason. When the abrasive particles fall off from the inner peripheral face, the larger the size of the abrasive particles, the deeper the recesses left in the surface of the inner peripheral face after the abrasive particles have fallen off. Since the embedded abrasive particles are distributed across the inner peripheral face, contiguous recesses are formed on the surface of the inner peripheral face, resulting in projections being formed between the recesses, as illustrated in FIG. 9. If such projections are rubbed by large size abrasive particles, cutting (snapping off of the projections) occurs instead of grinding, generating large size abraded grit. This leads to adhesive wear occurring, such that chain stretching cannot be appropriately suppressed. Thus as long as the abrasive particles of alumina are 3 μm or smaller, then the abraded grit is also 3 μm or smaller, enabling the occurrence of adhesive wear to be suppressed. A small particle size for the abrasive particles is accordingly preferable, since the smaller the particle size of the abrasive particles, the smaller the particle size of the abraded grit generated. The abrasive particles may be a fine powder of 1 μm or smaller, or abrasive particles of different particle sizes may be mixed together, as long as they are particles of 3 μm or smaller. Note that similar applies when employing other abrasive particles, such as SiC or other grinding agents.

Moreover, a bush chain the present application includes plural units that are coupled together in an endless shape. Each unit includes a pair of inner plates each including a pair of bush holes, a bush that is fixed to the bush hole and includes a pin hole, a pair of outer plates that are each disposed at the outside of the respective inner plate, and a coupling pin that is fixed to the outer plates, and is inserted through and rotatable in the pin hole of the bush. Abrasive particles are embedded in an inner peripheral face at the pin hole of the bush.

In the bush chain of the present application, when adjacent inner plates and outer plates flex with respect to each other, the abrasive particles embedded in the inner peripheral face at the pin hole of the bush fall out due to friction with the coupling pin, and function as abrasive particles between the pin hole and the coupling pin. Generally, the bush is press fitted into the bush holes of the inner plates, and the diameter at the two end portions of the pin holes in the bush is reduced by an interference amount. The two end portions of the coupling pins accordingly contact the inner peripheral face of the bushes more firmly than central portions of the coupling pins. According to the present application, the inner peripheral faces at the two end portions of the pin holes are ground by the abrasive particles, thereby enabling stretching of the bush chain to be suppressed due to being able to make contact between the coupling pin and the bush inner peripheral face uniform. Moreover, the grinding effect of employing abrasive particles of a specific particle size suppresses generation of coarse abraded grit from occurring, thereby enabling the occurrence of adhesive wear by abraded grit to be prevented, and thus improving the wear characteristics. The above numerical limits for the silent chain may also be applied to the bush chain. The present application may also be applied to a roller chain in which rollers are rotatably provided at the outer periphery of the bushes of the bush chain.

Obviously, numerous modifications and variations of the present invention are possible in light of the above teachings. It is therefore to be understood that within the scope of the appended claims, the invention may be practiced otherwise than as specifically described herein.

What is claimed is:
1. A silent chain comprising:
   a first link configured from one or more first link plates that include a pair of first pin holes;

a second link configured from one or more second link plates that include a pair of second pin holes; and coupling pins that are inserted through the respective first pin holes of the first link plate and the respective second pin holes of the second link plate, wherein the coupling pins alternately couple the first link and the second link together along a chain drive direction so as to enable the first link and the second link to flex, and abrasive particles are embedded in inner peripheral faces at the pin holes of the first link plate and the second link plate.

2. The silent chain according to claim 1, wherein:
the hardness of an outer peripheral face of the coupling pin is higher than the hardness of the inner peripheral face at the pin hole; and
the hardness of the abrasive particles is lower than the hardness of the outer peripheral face of the coupling pin, and higher than the hardness of the inner peripheral face at the pin hole.

3. The silent chain of claim 1, wherein the abrasive particles are $Al_2O_3$, and the proportion of Al by mass in a region from the outermost surface of the pin hole to the deepest location at which Al is present is 2.5% by mass or greater.

4. The silent chain of claim 1, wherein the average size of the abrasive particles is 3 μm or smaller.

5. A silent chain comprising:
a first link including at least one first link plate that has a pair of first pin holes;
a second link including at least one second link plate that has a pair of second pin holes;
abrasive particles embedded in inner peripheral faces of the first pin holes and the second pin holes; and
a coupling pin inserted through one of the first pin holes and one of the second pin holes so that the first link and the second link are alternately coupled along a chain drive direction in which the silent chain is to move so that the first link and the second link are flexible along the chain drive direction.

6. The silent chain according to claim 5,
wherein a hardness of an outer peripheral face of the coupling pin is higher than a hardness of the inner peripheral faces of the first pin holes and the second pin holes, and
wherein a hardness of the abrasive particles is lower than the hardness of the outer peripheral face of the coupling pin, and higher than the hardness of the inner peripheral faces of the first pin holes and the second pin holes.

7. The silent chain according to claim 5,
wherein the abrasive particles comprise $Al_2O_3$, and
wherein a proportion of Al by mass in a region from outermost surfaces of the first pin holes and the second pin holes to a deepest location at which Al is present is 2.5% by mass or greater.

8. The silent chain according to claim 5, wherein an average size of the abrasive particles is 3 μm or smaller.

9. A bush chain comprising
a plurality of units that are coupled together in an endless shape and each include:
a pair of inner plates each including a pair of bush holes;
a bush that is fixed to the bush hole and includes a pin hole;
a pair of outer plates that are each disposed at the outside of the respective inner plate; and a coupling pin that is fixed to the outer plates, and is inserted through and rotatable in the pin hole of the bush, wherein abrasive particles are embedded in an inner peripheral face at the pin hole of the bush.

10. The bush chain of claim 9, wherein:
the hardness of an outer peripheral face of the coupling pin is higher than the hardness of the inner peripheral face at the pin hole; and
the hardness of the abrasive particles is lower than the hardness of the outer peripheral face of the coupling pin, and higher than the hardness of the inner peripheral face at the pin hole.

11. The bush chain of claim 9, wherein the abrasive particles are $Al_2O_3$, and the proportion of Al by mass in a region from the outermost surface of the pin hole to the deepest location at which Al is present is 2.5% by mass or greater.

12. The bush chain of claim 9, wherein the average size of the abrasive particles is 3 μm or smaller.

13. A bush chain comprising:
bush chain units coupled together in an endless shape and each comprising:
a first inner plate including a pair of first bush holes;
a second inner plate including a pair of second bush holes;
a bush having a first end and a second end opposite to the first end and provided between the first inner plate and the second inner plate so that the first end and the second end are inserted through one of the first bush holes and one of the second bush holes, respectively, the bush including a pin hole extending from the first end to the second end;
abrasive particles embedded in an inner peripheral face of the pin hole;
a first outer plate disposed on an opposite side of the bush with respect to the first inner plate;
a second outer plate disposed on an opposite side of the bush with respect to the second inner plate; and
a coupling pin connected to the first outer plate and the second outer plate and rotatably inserted through the pin hole of the bush.

14. The bush chain according to claim 13,
wherein a hardness of an outer peripheral face of the coupling pin is higher than a hardness of the inner peripheral face of the pin hole, and
wherein a hardness of the abrasive particles is lower than the hardness of the outer peripheral face of the coupling pin, and higher than the hardness of the inner peripheral face of the pin hole.

15. The bush chain according to claim 13,
wherein the abrasive particles comprise $Al_2O_3$, and
wherein a proportion of Al by mass in a region from an outermost surface of the pin hole to a deepest location at which Al is present is 2.5% by mass or greater.

16. The bush chain according to claim 13, wherein an average size of the abrasive particles is 3 μm or smaller.

17. A roller chain comprising
a plurality of units that are coupled together in an endless shape and each include:
a pair of inner plates each including a pair of bush holes;
a bush that is fixed to the bush hole and includes a pin hole;
a roller that is rotatably supported at an outer periphery of the bush;

a pair of outer plates that are each disposed at the outside of the respective inner plate; and a coupling pin that is fixed to the outer plates, and is inserted through and rotatable in the pin hole of the bush, wherein abrasive particles are embedded in an inner peripheral face at the pin hole of the bush.

18. The roller chain of claim 17, wherein:

the hardness of an outer peripheral face of the coupling pin is higher than the hardness of the inner peripheral face at the pin hole; and the hardness of the abrasive particles is lower than the hardness of the outer peripheral face of the coupling pin, and higher than the hardness of the inner peripheral face at the pin hole.

19. The roller chain of claim 17, wherein the abrasive particles are $Al_2O_3$, and the proportion of Al by mass in a region from the outermost surface of the pin hole to the deepest location at which Al is present is 2.5% by mass or greater.

20. The roller chain of claim 17, wherein the average size of the abrasive particles is 3 μm or smaller.

21. A roller chain comprising:

roller chain units coupled together in an endless shape and each comprising:

a first inner plate including a pair of first bush holes;

a second inner plate including a pair of second bush holes;

a bush having a first end and a second end opposite to the first end and provided between the first inner plate and the second inner plate so that the first end and the second end are inserted through one of the first bush holes and one of the second bush holes, respectively, the bush including a pin hole extending from the first end to the second end, a roller being rotatably supported at an outer periphery of the bush;

abrasive particles embedded in an inner peripheral face of the pin hole;

a first outer plate disposed on an opposite side of the bush with respective to the first inner plate;

a second outer plate disposed on an opposite side of the bush with respective to the second inner plate; and a coupling pin connected to the first outer plate and the second outer plate and rotatably inserted through the pin hole of the bush.

22. The roller chain according to claim 21, wherein a hardness of an outer peripheral face of the coupling pin is higher than a hardness of the inner peripheral face of the pin hole, and wherein a hardness of the abrasive particles is lower than the hardness of the outer peripheral face of the coupling pin, and higher than the hardness of the inner peripheral face of the pin hole.

23. The roller chain according to claim 21, wherein the abrasive particles comprise $Al_2O_3$, and wherein a proportion of Al by mass in a region from an outermost surface of the pin hole to a deepest location at which Al is present is 2.5% by mass or greater.

24. The roller chain according to claim 21, wherein an average size of the abrasive particles is 3 μm or smaller.

* * * * *